United States Patent [19]

Hayase et al.

[11] Patent Number: 5,387,005
[45] Date of Patent: Feb. 7, 1995

[54] SUSPENSION CONTROL SYSTEM USING A VARIABLE THRESHOLD VALUE TO LIMIT THE AMPLITUDE OF VERTICAL VIBRATIONS

[75] Inventors: Kenji Hayase, Toyoake; Shunichi Wada, Himeji; Shigeki Ohtagaki, Himeji; Yoshihiro Tsuda, Himeji, all of Japan

[73] Assignees: Mitsubishi Denki Kabushiki Kaisha; Mitsubishi Jidosha Kogyo Kabushiki Kaisha, both of Tokyo, Japan

[21] Appl. No.: 141,201

[22] Filed: Oct. 26, 1993

[30] Foreign Application Priority Data

Oct. 30, 1992 [JP] Japan .................. 4-315971

[51] Int. Cl.⁶ ............. B60G 17/015; B60G 17/08
[52] U.S. Cl. ....................... 280/707; 364/424.05
[58] Field of Search .............. 280/707; 364/424.05

[56] References Cited

U.S. PATENT DOCUMENTS

| | | | |
|---|---|---|---|
| 4,648,622 | 3/1987 | Wada et al. | 280/707 |
| 4,685,689 | 8/1987 | Takizawa et al. | 280/707 |
| 4,765,648 | 8/1988 | Mander et al. | 280/707 |
| 4,787,650 | 11/1988 | Doi et al. | 280/707 |
| 4,805,101 | 2/1989 | Dietrich et al. | 280/707 |
| 4,934,731 | 6/1990 | Hiwatashi et al. | 280/707 |
| 5,071,159 | 12/1991 | Kamimura et al. | 280/707 |
| 5,072,965 | 12/1991 | Wada et al. | 280/707 |
| 5,142,475 | 8/1992 | Matsunaga et al. | 280/707 |
| 5,163,704 | 11/1992 | Wada | 280/707 |

FOREIGN PATENT DOCUMENTS

62-181412 11/1987 Japan .
62-181413 11/1987 Japan .

*Primary Examiner*—Richard M. Camby
*Assistant Examiner*—Peter C. English
*Attorney, Agent, or Firm*—Sughrue, Mion, Zinn, Macpeak & Seas

[57] ABSTRACT

A suspension control system having a suspension unit between a wheel and a body of a vehicle, a fluid supply device for supplying a fluid to the suspension unit, a fluid discharge device for discharging the fluid from the suspension unit, an amplitude measurement device for measuring the amplitude of vertical vibrations of the vehicle body, a threshold value setting device for setting a threshold value of the amplitude of vertical vibrations, a controller for cancelling expansion and contraction of the suspension unit by controlling the fluid supply and the fluid devices when the amplitude of vertical vibrations is equal to or larger than the threshold value, a counter for counting the number of times the fluid supply and fluid discharge devices are controlled by the controller in a predetermined time period, and a threshold value changing device for setting, when the number of times counted by the counter is equal to or larger than a reference number, the threshold value in the threshold value setting device to a value equal to or smaller than an upper limit but larger than a value to which the threshold value was set at a preceding time, and for setting the threshold value to a value equal to or larger than a lower limit but smaller than the value at the preceding time, when the counted number of times is smaller than the reference number.

5 Claims, 5 Drawing Sheets

SUSPENSION CONTROL SYSTEM USING A VARIABLE THRESHOLD VALUE TO LIMIT THE AMPLITUDE OF VERTICAL VIBRATIONS

BACKGROUND OF THE INVENTION

1. FIELD OF THE INVENTION

This invention relates to a suspension control system for electronically limiting vibrations of a body of a motor vehicle in a vertical direction caused by resonance of the vehicle body when the vehicle runs and, more particularly, to a suspension control system of this kind having improved control reliability and improved durability.

2. DESCRIPTION OF THE RELATED ART

Electronic suspension control systems are known in which a fluid (pneumatic) cylinder mechanism is provided between a vehicle body and wheels, a control target (operating time) of the cylinder mechanism is set according to the magnitude of vibrations in a vertical direction acting on the vehicle body, and the vibration amplitude is limited on the basis of the control target.

In this kind of suspension control system, a vibration limiting control is started when the period of vertical vibrations of the vehicle body is within a predetermined range and when the amplitude is larger than a reference threshold value, and the vibration limiting control is stopped when the amplitude is reduced below a predetermined level such that the vibrations are sufficiently limited. During the vibration limit control, a fluid is supplied to or discharged from the cylinder mechanism. If a detected vibration stroke is a contracting stroke, the cylinder mechanism is controlled so as to be extended. If a detected stroke is an extending stroke, the cylinder mechanism is controlled so as to be contracted. In this manner, a change in the attitude of the vehicle body is cancelled.

Figure 4:
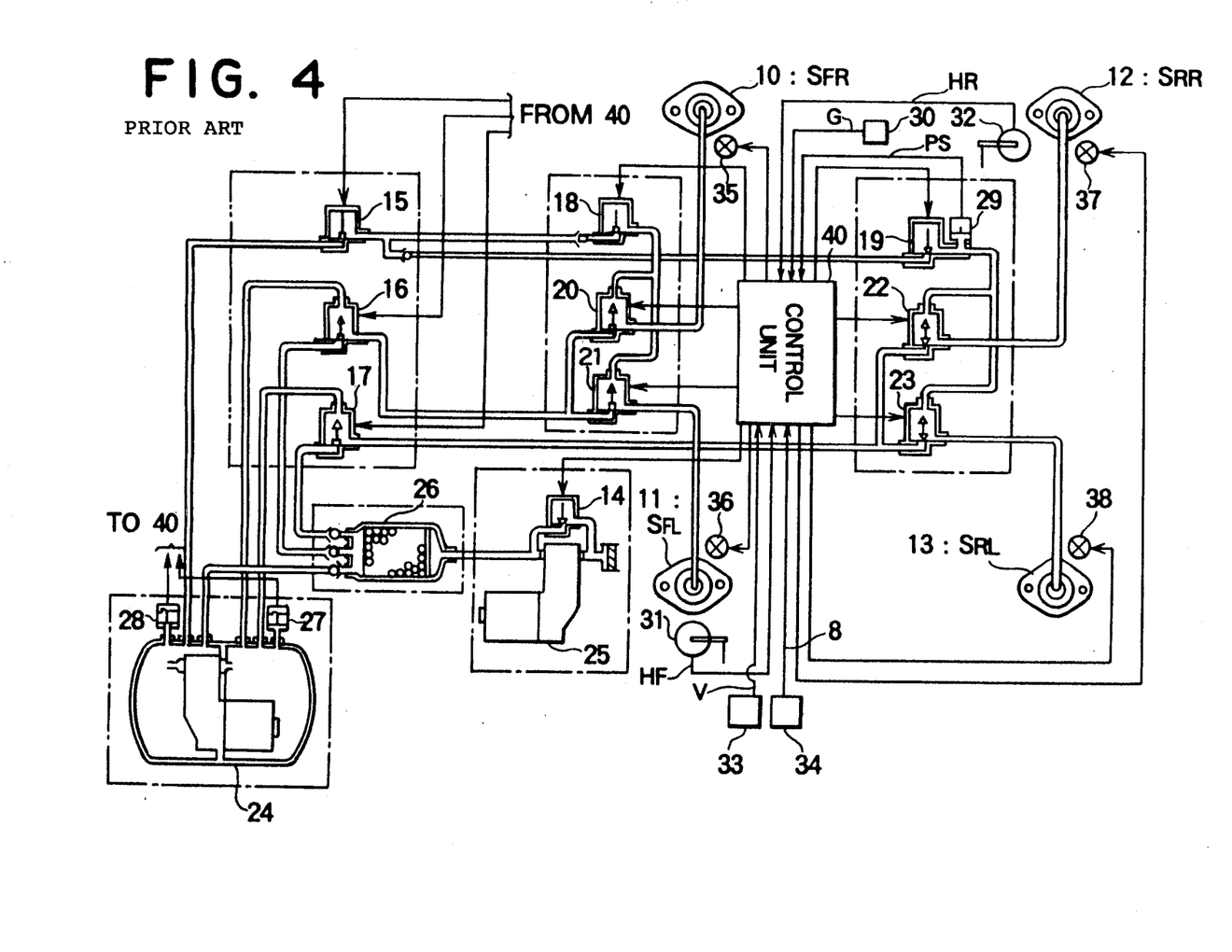
FIG. 4 is a diagram of a conventional suspension control system.

FIG. 4 shows an ordinary motor vehicle suspension control system such as that disclosed in Japanese Utility Model Laid-Open No. 62-181413.

As shown in FIG. 4, there are four suspension units: a suspension unit 10 for a right front wheel mounted on a vehicle body (hereinafter referred to as $S_{FR}$); a suspension unit 11 for a left front wheel on the vehicle body ($S_{FL}$); a suspension unit 12 for a right rear wheel on the vehicle body ($S_{RR}$), and a suspension unit 13 for a left rear wheel on the vehicle body ($S_{RL}$).

Each of the $S_{FR}10$, $S_{FL}11$, $S_{RR}12$, and $S_{RL}13$ is formed of a cylinder mechanism which includes a pneumatic suspension chamber and a shock absorber (both not shown), and is interposed between the vehicle body and the corresponding wheel.

Solenoid valves 14 to 23 serve for changeover control of communicated states of pipings. The solenoid valves 14, 15, 18, and 19 are opening-closing valves, while the solenoid valves 16, 17 and 20 to 23 are three-way changeover valves. Each of the three-way changeover valves 16, 17, and 20 to 23 includes a supply valve and a discharge valve, and these changeover valves form, together with the pipings, supply means and discharge means for pneumatic suspension chambers of the $S_{FR}10$, $S_{FL}11$, $S_{RR}12$, and $S_{RL}13$.

First pipings from the solenoid valves 20 to 23 are independently connected to the $S_{FR}10$, $S_{FL}11$, $S_{RR}12$, and $S_{RL}13$. A first piping of the solenoid valve 16 communicates with second pipings of the solenoid valves 20 and 21. A first piping of the solenoid valve 18 communicates with third pipings of the solenoid valves 20 and 21.

A first piping of the solenoid valve 19 communicates with third pipings of the solenoid valves 22 and 23. A first piping of the solenoid valve 15 communicates with second pipings of the solenoid valves 18 and 19.

A reserve tank 24 has a high pressure chamber which communicates with a second piping of the solenoid valve 15. A compressor 25 is controlled by opening/closing of the solenoid valve 14. A drier 26 is connected to an output piping from the compressor 25.

The drier 26 communicates with the high pressure chamber of the reserve tank 24 through a check valve in a normal direction, and also communicates with second pipings of the solenoid valves 16 and 17 through a check valve in a reverse direction.

Third pipings of the solenoid valves 16 and 17 communicate with a low pressure chamber of the reserve tank 24.

A pressure sensor 27 detects a pressure PL of the pressure chamber of the reserve tank 24. A pressure sensor 28 detects a pressure PH of the high pressure chamber of the reserve tank 24, and a pressure sensor 29 detects the pressure in the first piping of the solenoid valve 19 as a suspension pressure PS. An acceleration sensor 30 detects an acceleration G in the vertical direction of the vehicle body. A vehicle height sensor 31 detects a height HF of a front portion of the vehicle body. A vehicle height sensor 32 detects a height HR of a rear portion of the vehicle body. A vehicle speed sensor 33 detects a vehicle speed V, A steering sensor 34 detects a steering angle $\theta$.

Actuators 35 to 38 serve to mechanically change the damping forces of the shock absorbers and are provided in correspondence with the $S_{FR}10$, $S_{FL}11$, $S_{RR}12$, and $S_{RL}13$.

A control unit 40 controls, for suspension control, the solenoid valves 14 to 23, the actuators 35 to 38 and other components on the basis of detection signals from the sensors 27 to 34 and other components.

Figure 5:
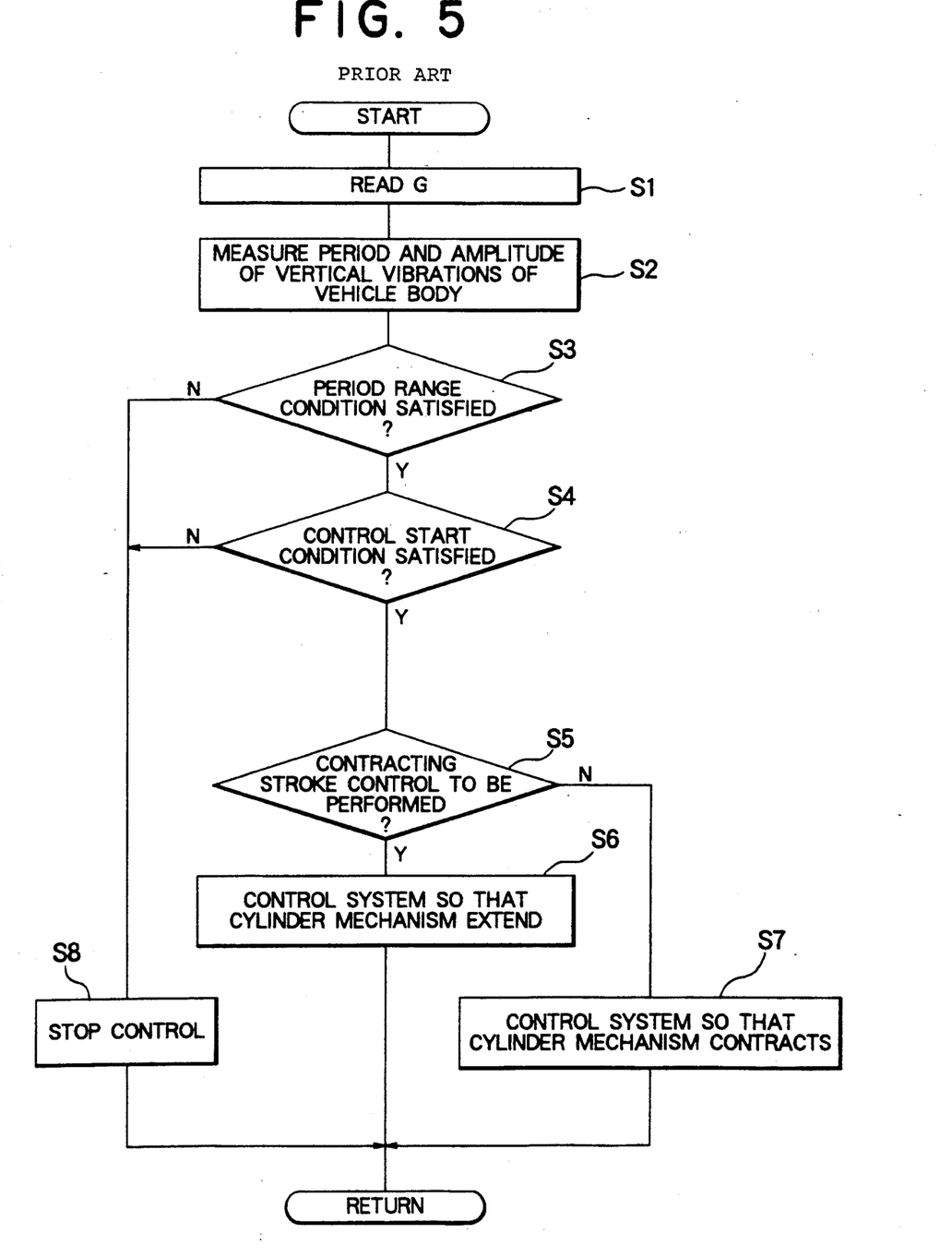
FIG. 5 is a flowchart of the vibration limiting control operation of a conventional suspension control system.

FIG. 5 is a flowchart of the suspension control operation of the control unit 40, showing a processing for detecting and determining vertical vibrations of the vehicle body and attitude control processing in accordance with vertical vibrations.

The operation of the conventional suspension control system will be described with reference to FIGS. 4 and 5. The processing shown in FIG. 5 is executed every period of predetermined sampling time (E.g., 6 m sec).

First, the solenoid valve 14 makes the compressor 25 effective under the control of the control unit 40 to supply air compressed by the compressor 25 to the high pressure chamber of the reserve tank 24 through the drier 26.

Also, the solenoid valves 15 to 23 in association with the $S_{FR}10$, $S_{FL}11$, $S_{RR}12$, and $S_{RL}13$ operate under the control of the control unit 40 to supply compressed air accumulated in the high pressure chamber of the reserve tank 24 to the $S_{FR}10$, $S_{FL}11$, $S_{RR}12$, and $S_{RL}13$ and to release the compressed air in the $S_{FR}10$, $S_{RR}12$, and $S_{RL}13$ to the low pressure chamber of the reserve tank.

At this time, the magnitude (amplitude) and the period of vertical vibrations of the vehicle body are measured on the basis of the acceleration G and air is supplied to or discharged from the pneumatic suspension chambers of the $S_{FR}10$, $S_{FL}11$, $S_{RR}12$, and $S_{RL}13$ in accordance with the amplitude and the period to reduce changes caused in the attitude of the vehicle.

For this operation, the solenoid valves 15 to 23 are controlled in accordance with the processing routine shown in FIG. 5, as described below.

First, the acceleration G detected by the acceleration sensor 30 is read as data on vibrations of the vehicle body in the vertical direction (step S1), and the period and the amplitude of vertical vibrations of the vehicle body are measured (step S2).

Next, determination is made as to whether the period of vertical vibrations of the vehicle body satisfies a condition that it is within a period range in which the attitude control is to be effected (step S3). If YES (the period condition is satisfied), determination is then made as to whether the amplitude of the vertical vibrations satisfies a control start condition (stem S4).

The control start condition used as determination criterion in step S4 is previously set as a first threshold value (determination criterion) in the control unit 40. Accordingly, if the amplitude of the vehicle vibrations is greater than the first threshold value, it is determined that the control start condition is satisfied.

If the result of determination in step S4 is YES (the control start condition is satisfied), determination is made as to whether or not a control for a contracted stroke of the vertical vibrations is to be performed (step S5).

If the result of determination in step S5 is YES contracted stroke control), the solenoids are controlled so that the cylinder mechanisms of the $S_{FR}10$, $S_{FL}11$, $S_{RR}12$, and $SR_{13}$ are extended (step S6). Conversely, if NO (extending stroke control), the solenoids are controlled so that the cylinder mechanisms are contacted (step S7). Then, the process returns.

In this manner, a vibration amplitude limiting control is performed so that vibrations of the vehicle body are cancelled. Once the vibration limiting control in steps S6 and S7 described above is started, the control start determination criterion of step S4 is set to a value of a lower level (second threshold value) for a certain period of time in order to prevent chattering and to sufficiently reduce vertical vibrations.

That is, the second threshold value (lower limit value) smaller than the first threshold value is used as a comparison criterion in step S4 to ensure that the amplitude after the start of the control is determined as a value greater than the second threshold value, and that the limiting control in steps S6 and S7 is continued until vertical vibration are sufficiently converged.

Thereafter, if it is determined in step S4 that the vibration amplitude is smaller than the second threshold value or in step S3 that the vibration period is out of the predetermined range, the limiting control is terminated (step S8), and the process returns. At this time, the determination criterion of step S4 is reset to the first threshold value.

However, there is a possibility that vertical vibrations of the vehicle body will be continuously detected for a long time during, for example, continuous traveling on an expressway or the like under certain road surface conditions. In such a situation, if the vibration limiting control start condition (first threshold value) is set to a fixed value, the vibration limiting control is restarted always in response to vibrations of the same level, and a control operation of continuously supplying air to and discharging air from the cylinder mechanisms is repeated.

Accordingly, the difference between the pressures in the high pressure chamber and the low pressure chamber of the reserve tank 24 is reduced and the difference between the pressures in the fluid suspension chambers of the $S_{FR}10$, $S_{FL}11$, $S_{RR}12$, and $S_{RL}13$ at the time of air supply and the pressures in these chambers at the time of air discharge becomes substantially zero. The effect of vibration limiting control is thereby reduced. Also, the operating frequency of the actuator elements including the solenoid valves 14 to 23 and the compressor 25 is increased, resulting in a reduction in the durability, i.e., the life of such elements.

As described above, since a start condition of vibration limiting control is set to a fixed value in the conventional suspension control system, the operation of supplying air to and discharging air from the fluid cylinder mechanisms in the $S_{FR}10$, $S_{FL}11$, $S_{RR}12$, and $S_{RL}13$ is performed repeatedly until the difference between the pressures during air supply and discharge is reduced so that the vibration limiting effect is considerably low, if vibrations are continuously detected. The problem of a reduction in the durability of the compressor 25 and other components is also encountered.

SUMMARY OF THE INVENTION

In view of the above-described problems, an object of the present invention is to provide a suspension control system in which a reduction in vibration limiting effect is prevented by preventing the vibration limiting control from being excessively repeated to ensure improved control reliability, and in which the durability of the compressor and other components is improved.

To achieve this object, according to the present invention, there is provided a suspension control system comprising a suspension unit interposed between a wheel and a body of a vehicle and having a fluid suspension function, fluid supply means for supplying a fluid to the suspension unit, fluid discharge means for discharging the fluid from the suspension unit, amplitude measurement means for measuring the amplitude of vertical vibrations of the vehicle body, threshold value setting means for setting a threshold value of the amplitude of vertical vibrations of the vehicle body, control means for cancelling expansion and contraction of the suspension unit by controlling the fluid supply means and the fluid discharge means when the amplitude of vertical vibrations measured by the amplitude measurement means is equal to or larger than the threshold value, count means for counting the number of times the fluid supply means and the fluid discharge means are controlled by the control means in a predetermined period of time, and threshold value changing means for setting, when the count value counted by the count means is equal to or larger than a reference number of times, the threshold valve in the threshold value setting means to a value equal to or smaller than an upper limit value but larger than a value to which the threshold value was set at a preceding time, and for setting the threshold value in the threshold value setting means to a value equal to or larger than a lower limit value but smaller than the value at the preceding time, when the count value is smaller than the reference number of times.

DESCRIPTION OF THE PREFERRED EMBODIMENTS

The preferred embodiments of the present invention will be described below with reference to the accompanying drawings.

Embodiment 1

Figure 1:
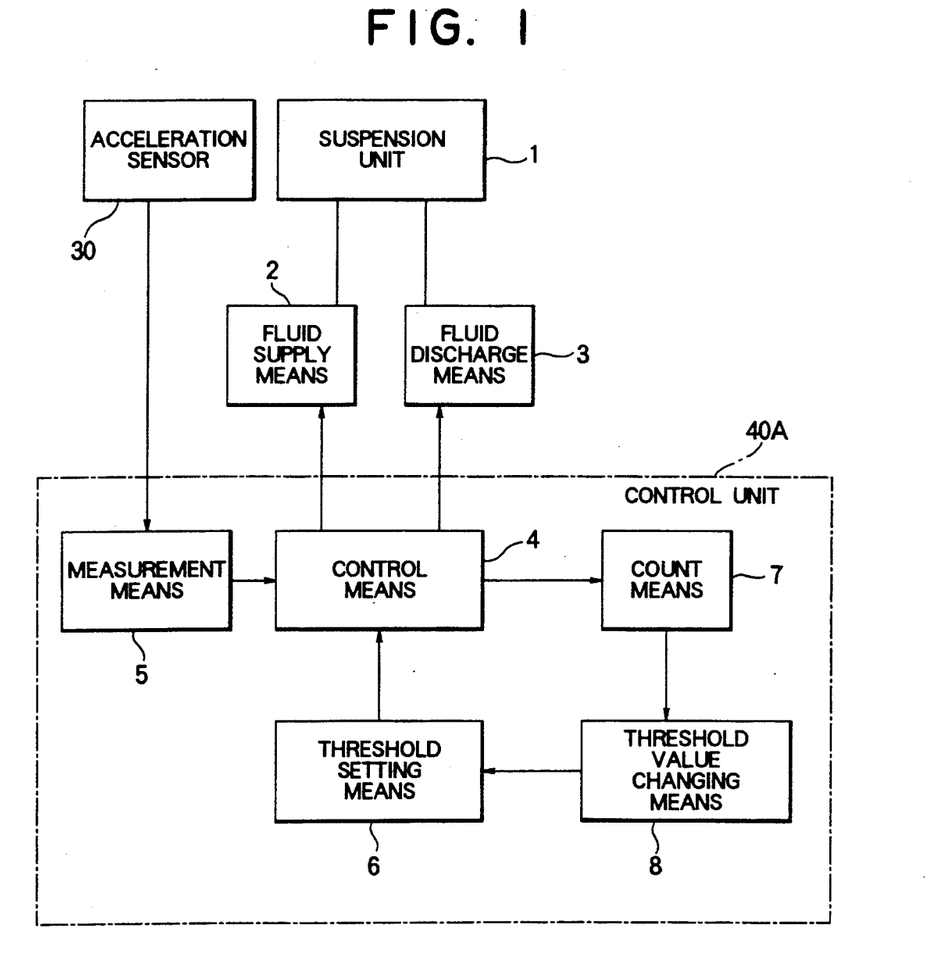
FIG. 1 is a block diagram of the construction of a suspension control system in accordance with a first embodiment of the present invention.

FIG. 1 shows the construction of a suspension control system in accordance with the first embodiment of the present invention. A suspension unit 1 having a fluid suspension function for limiting vibrations of a body of a vehicle is interposed between the vehicle body and each of wheels of the vehicle. A fluid supply means 2 and a fluid discharge means 3 are connected to the suspension unit 1. A control means 4 is connected to the fluid supply means 2 and the fluid discharge means 3. An acceleration sensor 30 for detecting an acceleration G of the vehicle body in a vertical direction is connected to the control means 4 through a measurement means 5. To the control means 4 are also connected a threshold value setting means 6 for setting an amplitude threshold value as a control condition of the fluid supply means 2 and the fluid discharge means 3, and a count means 7 for counting the number of times the control means 4 controls the fluid supply means 2 and the fluid discharge means 3 within a predetermined period of time. A threshold value changing means 8 for changing the amplitude threshold value of the threshold value setting means 6 according to the number of control times counted by the count means 7 is connected to the count means 7. The control means 4, the measurement means 5 the threshold value setting means 6 the count means 7 and the threshold value changing means 8 form a control unit 40A.

Actually, the suspension control system of the first embodiment has the same construction as the conventional control system shown in FIG. 4. That is, the suspension units 10 to 13 shown in FIG. 4 correspond to the suspension unit 1, and the solenoid valves 14 to 23, the reserve tank 24, the compressor 25 and the drier 26 correspond to the fluid supply means 2 and the fluid discharge means 3 shown in FIG. 1. In the suspension control system of the first embodiment, however, the control unit 40A is provided in place of the control unit 40 shown in FIG. 4.

The count means 7 includes an increment type control number counter for counting the number of control times N, and a decrement type timer counter for counting a predetermined time period T (e.g., about 45 sec). The threshold value setting means 6 has an upper limit Smax and a lower limit Smin of an amplitude threshold value KS. The threshold value changing means 8 has a reference number KN of the number of control times N which is set previously. When the number of control times N of the control means 4 operation within the predetermined period T is equal to or greater than the reference number KN, the threshold value changing means 8 makes the threshold value setting means 6 set the amplitude threshold value KS to a value equal to or smaller than the upper limit Smax but greater than a value to which it was set at a preceding time. When the number of control times N is smaller than than the reference number KN, the threshold value changing means 8 makes the threshold value setting means 6 set the amplitude threshold value KS to a value equal to or greater than the lower limit Smin but smaller than the value at the preceding time.

Figure 2:
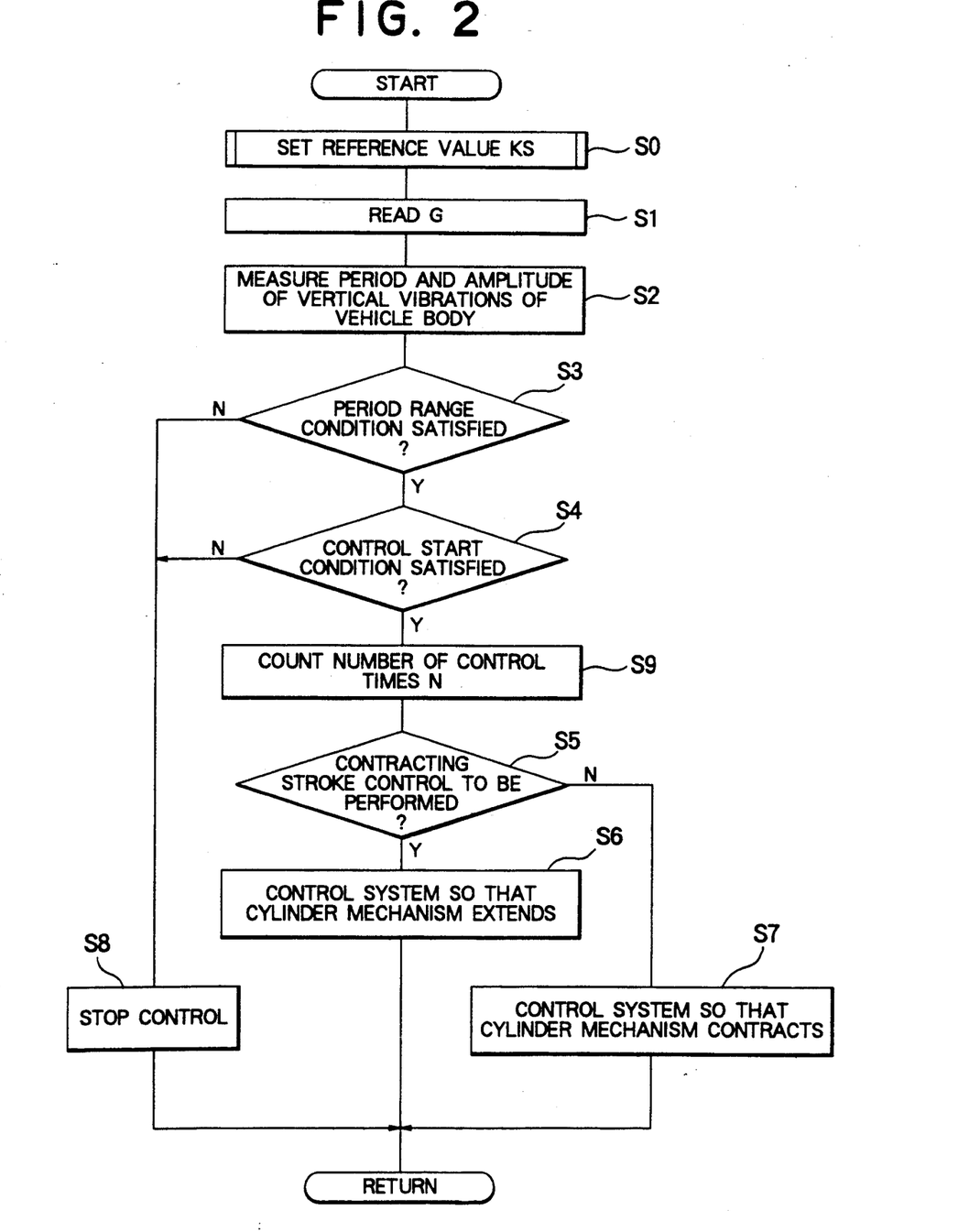
FIG. 2 is a flowchart of the vibration limiting control operation in the first embodiment.

The amplitude limiting control operation in accordance with the first embodiment will be described with reference to the flowchart of FIG. 2. Steps S1 to S8 in FIG. 2 are the same as the steps having the corresponding numbers of the conventional operation shown in FIG. 5. First, in step S0, the amplitude threshold value KS used as an attitude control start condition with respect to vertical vibrations is set by the threshold value setting means 6. In step S1, the acceleration G of the vehicle body in the vertical direction is read from the acceleration sensor 30. In step S2, the period and the amplitude of vertical vibrations of the vehicle are measured on the basis of the acceleration G by the measurement means 5.

In step S3, determination is made as to whether the measured period of vibrations satisfies a condition that it is within a period range in which the attitude control is to be effected. If it is determined that the period range condition is satisfied, determination is then made in step S4 as to whether the amplitude of the vertical vibrations satisfies the control start condition. That is, it is determined that the control start condition is satisfied, when the amplitude measured by the measurement means 5 is equal to or greater than the threshold value KS set by the threshold value setting means 6.

If it is determined in step S4 that the control start condition is satisfied, the control time counter of the count means 7 counts the number of control times N of the control means 4 operation in step S9. Thereafter, in step S5, determination is made as to whether or not the stroke of vertical vibrations is a contracted stroke. If YES, the process proceeds to stem S6 and the control means 4 controls the fluid supply means 2 and the fluid discharge means 3 in a direction such as to extend the cylinder mechanism of the suspension unit 1. If NO as a result of the determination in step S5, the process proceeds to step S7 and the control means 4 controls the fluid supply means 2 and the fluid discharge means in a direction such as to contract the cylinder mechanism of the suspension unit 1. Then, the process returns.

In this manner, a vibration amplitude limiting control is performed so that vibrations of the vehicle body are cancelled. The number of control times N is incremented by the control time counter in the counter means 7 each time the vibration amplitude limiting control is executed in response to the result of determination in step S4. If the result of determination in stem S3 or S4 is NO, the process proceeds to step S8 to stop the vibration amplitude limiting control, and returns.

Figure 3:
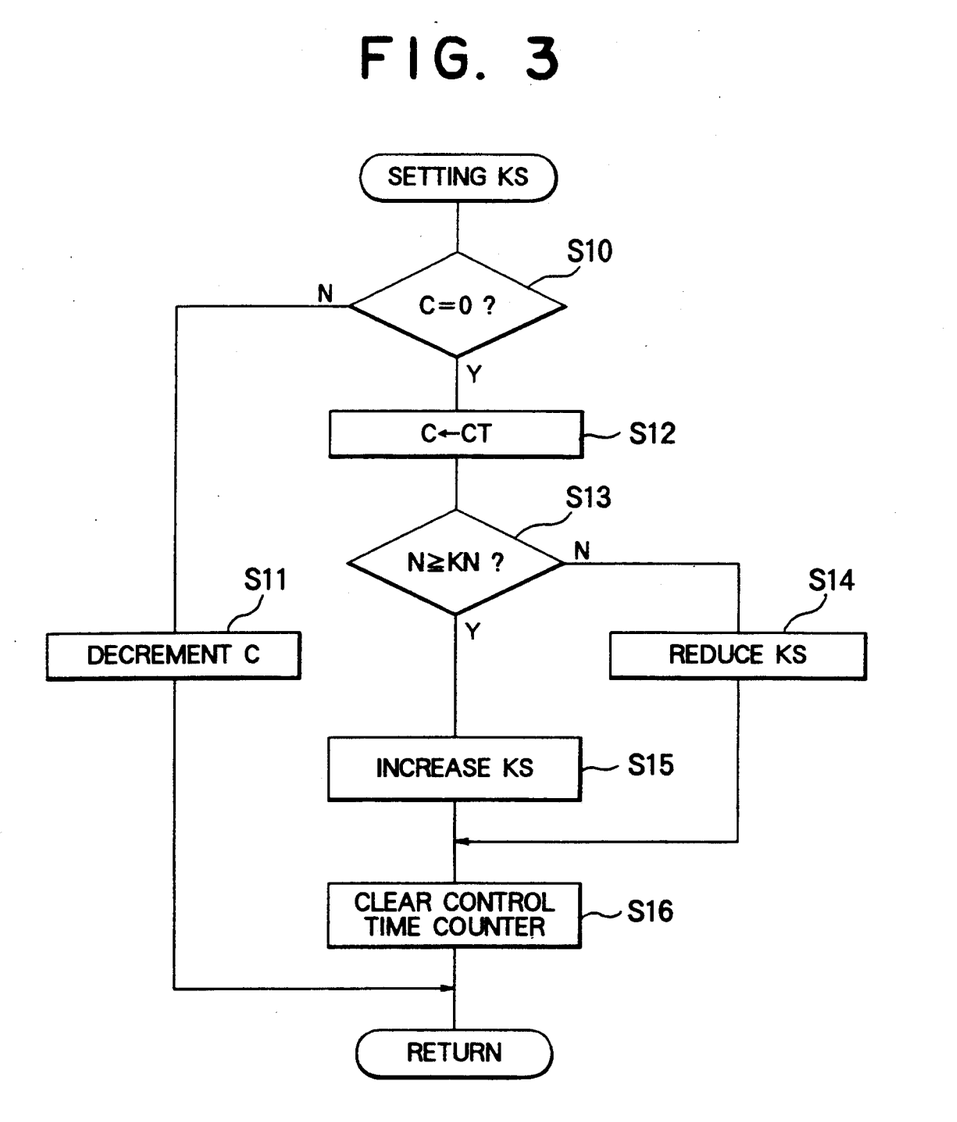
FIG. 3 is a flowchart of the threshold value setting operation in the first embodiment.

Details of the amplitude threshold value KS setting stem S0 shown in FIG. 2 will be described with reference to FIG. 3. A counter value CT corresponding to the predetermined time period T is previously set in the timer counter in the count means 7 and is always counted down.

First, in step S10, determination is made by referring to the timer counter as to whether a counter value C has been counted down to 0.

If NO (C>0), the timer counter value C is decremented in step S11 and the process returns to continue measuring the predetermined time period T. If YES (C=0), the threshold value KS is set on the basis of the number of control times N in the predetermined time period T, as described below.

In step S12, the timer counter value C is reset to the value CT corresponding to the predetermined time period T and, in step S13, determination is made as to whether the reference number KN has been reached or exceeded by referring to the number of control times at the time when the predetermined time T elapses.

If NO (N<KN), the pressure difference of the cylinder mechanism is regarded as restored since the control frequency is small, and in step S14, the amplitude threshold value KS used as the control start condition is reduced by a predetermined value from the value at the preceding time. However, the amplitude threshold value KS is not set to a value equal to or smaller than the lower limit value Smin.

On the other hand, if the result of determination in Step S13 is YES (N≧KN), it is supposed that the control frequency is regarded as excessively large and, in step S15, the amplitude threshold value KS as the control start condition is increased by a predetermined value from the value at the preceding time. However, the amplitude threshold value KS is not set to a value greater than the upper limit value Smax.

In this manner, by the operation of steps S14 and 15, the amplitude threshold value KS is updated every predetermined time T between the upper and lower limit values Smax and Smin according to the number of control times N.

Thereafter, in step S16, the counter for counting the number of control times N is cleared to 0, and the process returns.

As described above, if starting the control is continuously repeated, the threshold value KS is increased to prevent a reduction in the pressure difference and deterioration of components due to an excessively large control frequency. If the control frequency is sufficiently limited and if the pressure difference is restored, the threshold value KS is reduced to restore the vibration limiting control ability.

Since the increase/decrease adjustment of the amplitude threshold value KS used as a control start condition is performed every predetermined time T, a feeling of strangeness due to a change in the threshold value KS is small.

Embodiment 2

In the above-described embodiment, the amplitude threshold value KS is changed by a predetermined value from the value at the preceding time according to the number of control times N in the predetermined time period T. However, the arrangement may alternatively be such that a third threshold value between the initial threshold value and the upper limit value Smax and a fourth threshold value between the initial threshold value and the lower limit value Smin are previously set and the amplitude threshold value KS is changed to the third or fourth threshold value according to the number of control times N in the predetermined time period T.

Embodiment 3

In the first embodiment, the measurement means 5 in the control unit 40A measures the amplitude of vibrations of the vehicle body from the acceleration G of the vehicle body in the vertical direction detected by the acceleration sensor 30, and the control means 4 determines a start of the amplitude limiting control by comparing the measured amplitude and the amplitude threshold value KS set by the threshold value setting means 6. However, the arrangement may be such that the threshold value setting means 6 sets an acceleration KG in correspondence with the amplitude threshold value KS and the control means 4 compares the acceleration G detected by the acceleration sensor 30 and the set acceleration KG.

It is not always necessary to calculate the amplitude of vertical vibrations of the vehicle body from the acceleration G. The amplitude may be detected by any other means, for example, a mechanical detection means.

What is claimed is:

1. A suspension control system comprising:
    a suspension unit interposed between a wheel and a body of a vehicle and having a fluid suspension function;
    fluid supply means for supplying a fluid to said suspension unit;
    fluid discharge means for discharging the fluid from said suspension unit;
    amplitude measurement means for measuring the amplitude of vertical vibrations of the vehicle body;
    threshold value setting means for setting a threshold value of the amplitude of vertical vibrations of the vehicle body;
    control means for cancelling expansion and contraction of said suspension unit by controlling said fluid supply means and said fluid discharge means when the amplitude of vertical vibrations measured by said amplitude measurement means is equal to or larger than the threshold value;
    count means for counting the number of times said fluid supply means and said fluid discharge means are controlled by said control means in a predetermined period of time; and
    threshold value changing means for changing, when a count value counted by said count means is equal to or larger than a reference number of times, the threshold value in said threshold value setting means to a value equal to or smaller than an upper limit value but larger than a value to which the threshold value was set at a preceding time, and for changing the threshold value in said threshold value setting means to a value equal to or larger than a lower limit value but smaller than the value at the preceding time, when the count value is smaller than the reference number of times.

2. A suspension control system according to claim 1, wherein said threshold value changing means changes the threshold value to a value larger than the value at the preceding time by a predetermined amount, when the count value of said count means is equal to or larger than the reference number of times, and changes the threshold value to a value smaller than the value at the preceding time by a predetermined amount, when the count value is smaller than the reference number of times.

3. A suspension control system according to claim 1, wherein said threshold value changing means changes the threshold value to a first fixed value previously set below the upper limit value, when the count value of said count means is equal to or larger than the reference number of times, and changes the threshold value to a second fixed value previously set above the lower limit value, when the count value is smaller than the reference number of times.

4. A suspension control system according to claim 1, wherein said amplitude measurement means includes an acceleration sensor for detecting an acceleration of the vehicle body in a vertical direction.

5. A suspension control system according to claim 1, wherein said count means includes an increment type control number counter for counting the number of times of the control by said control means, and a decrement type timer counter for counting the predetermined time period.

* * * * *